July 27, 1926.
L. P. DWYER
1,593,574
DIRECTION INDICATOR FOR MOTOR VEHICLES
Filed June 27, 1924
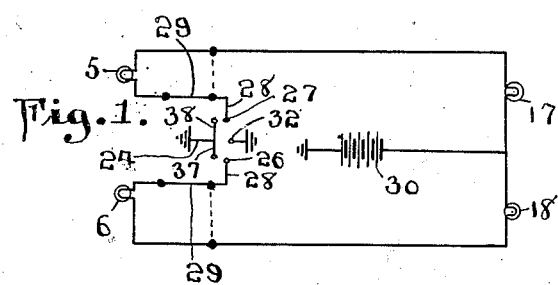
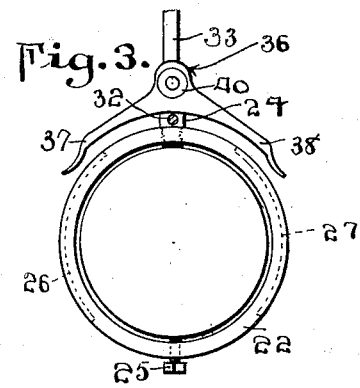
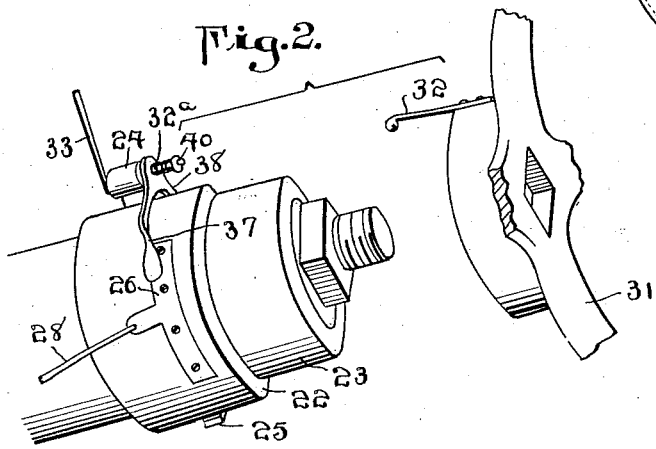
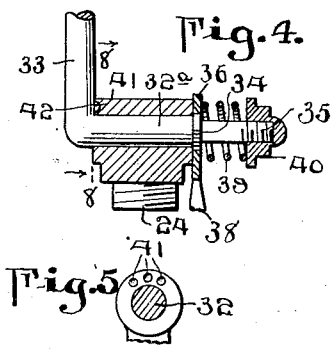
Inventor
Leonard. P. Dwyer
By Adam E. Fisher.
Attorney Patented July 27, 1926.

1,593,574

UNITED STATES PATENT OFFICE.

LEONARD P. DWYER, OF CHICAGO, ILLINOIS.

DIRECTION INDICATOR FOR MOTOR VEHICLES.

Application filed June 27, 1924. Serial No. 722,705.

This invention relates to improvements in direction indicators for motor vehicles and more particularly to a signaling device arranged to notify the driver of a following vehicle, the intention of the driver of a forward vehicle to turn either to the right or left.

The primary object of the invention is to provide a motor vehicle with rear lights adapted to be illuminated automatically when the vehicle turns in either direction, to indicate the direction of turning to the driver of the following vehicle.

A further object is to provide a signaling device of this character, which may also be manually actuated to indicate the direction of turning, before the vehicle actually begins to turn.

Another object of the invention is to furnish an indicator of this type, with front lamps which will throw beams of light to the right or left, forward of the vehicle, depending on the direction in which the vehicle is to be turned, these forward lamps being controlled by separate switches, so that the rear lamps may be actuated independently of the front lamps.

A still further object is to provide an improved switch for controlling signal lamps.
With the foregoing objects outlined and with other objects in view, which will appear as the description proceeds, the invention consists in the novel features hereinafter described in detail, illustrated in the accompanying drawing and more particularly pointed out in the appended claims.

Referring to the drawing:

Fig. 1 is a diagram of the electric wiring system employed in my signaling device.
Fig. 2 is a perspective view of the upper end of the steering post and a portion of the steering wheel, with my improvements applied thereto.

Fig. 3 is an end view of the switch.
Fig. 4 is a longitudinal sectional view of a portion of said switch.

Fig. 5 is a sectional view taken on line 8—8 of Fig. 4.

In the drawings, 1 designates a motor vehicle having front signaling lamps 2 mounted on the cowl. These lamps are best shown in Figs. 1, 2 and 9 and they consist of lamp casings 3 having reflectors arranged to project their beams at angles of about 90 degrees relatively to each other. These casings are mounted on a common support 4 and contain electric lamp bulbs 5 and 6. These bulbs are to be separately controlled, so that the lamp which directs its beam to the right may be actuated when the car is to be turned to the right, and the lamp directing its beam to the left, may be actuated when it is intended to turn the vehicle to the left.

Mounted on the rear of the vehicle is a signal lamp casing 7 having an H-shaped partition 8 dividing the interior of the casing into four compartments 9, 10, 11 and 12. Each of these compartments has a window 13, 14, 15 and 16 through which the rays from electric light bulbs may penetrate. The windows 15 and 16 are arrow shaped, one directed toward the left and the other toward the right. The windows 16 will be covered with red glass and the window 15 with green glass, so that when a turn is to be made to the left, a red light will be displayed, and when a turn is made to the right, a green light will be displayed. The compartment 9 may contain an ordinary parking light, while the compartment 10 contains a stop light.

The lamps or bulbs used with the rear casing are designated 17, 18, 19 and 20 and they are all carried by the base plate 21 of the casing.

The combination switch for controlling the signal lamps, is best shown in Figs. 5 to 8 inclusive, and it consists of an insulated collar 22 surrounding the steering post 23, and fixed to the latter by a threaded stud 24 and a screw 25. This collar carries metallic conductor plates 26 and 27 connected by wires 28 to the switches 29 as indicated diagrammatically in Fig. 4. When the switches 29 are in the positions shown in Fig. 4, current may travel through either of the front bulbs 5 and 6 and thence through either of the rear lamps 17 or 18 back to the battery 30. When the switches 29 are in the dotted line positions shown in Fig. 4, the current may pass through either of the rear lamps 17 or 18, without illuminating the front lamps.

For the purpose of controlling the passage of the current through the right or left lamps, while the steering wheel 31 is turning, I have provided the steering wheel with a spring arm 32 which moves over the collar 22 and contacts with either one of the plates 26 or 27, depending on the direction of movement of the steering wheel. With this construction it will be understood that when the steering wheel is turned to bring the arm 32 into engagement with the plate 26, the current will travel from the battery 30, through the lamps 18 and 6, up the wire 28 to plate 26 and to spring arm 32, then through post 23 to ground. When the steering wheel is moved toward the right, the same action will take place through the lamps 17 and 5.

For the purpose of actuating the lamps independently of the steering wheel, I have provided manual means, consisting of a rock shaft 32ª provided with a handle 33. This rock shaft is turnably mounted in the stud 24 and is provided with a square portion 34 and a threaded portion 35. A yoke 36 is arranged on the square portion of the rock shaft and its oppositely directed arms 37 and 38 are adapted to alternately engage the conductor plates 26 and 27. A spring 39 is held on the rock shaft by a nut 40 and presses against the plate 36. The front face of the stud 24, has three cavities 41, as shown in Fig. 8 adapted to be engaged by a lug 42 on the handle 33, so as to hold the handle temporarily in the position to which it has been moved.

If it is desired to give a signal without actuating the steering wheel, or before the steering wheel has been turned, the operator moves the handle 33 in the desired direction, and for the purpose of this disclosure, we will assume that he has moved the same to bring the arm 37 into engagement with the plate 26. At this time the current will travel from the battery 30, through lamps 18 and 6, wire 28, plate 26, arm 37, rock shaft 32, stud 24 to ground.

As the operator may sometime forget to release the manually controlled switch, I have so arranged the arm 32 that it will automatically disconnect either arm 37 or 38 from its respective contact plate 26 or 27. For this purpose the arm 32 projects between the yoke 36 and the collar 22, as shown in Fig. 6. It will therefore be seen that the arm 32 will raise either arm 37 or 38 when the vehicle is turned, and will thus automatically throw out the manual switch.

From the foregoing it is believed that the construction, operation and advantages of the invention may be readily understood, and it is apparent that changes may be made in the details disclosed, without departing from the spirit of the invention as expressed in the claims.

What I claim and desire to secure by Letters-Patent is:

1. In an electric switch for motor vehicles embodying an insulated collar surrounding the steering post of a vehicle, conductor plates mounted on the collar in spaced relation, a stud of conducting material projecting thru the collar and engaging the steering post, a rock shaft mounted in the stud and having a handle, spaced cavities in the stud, a lug on the handle engageable with said cavities for holding the handle in adjusted positions, a yoke movable with the rock shaft and provided with oppositely extending arms engageable with either one of said plates, a spring on the rock shaft engaging the yoke, and a nut on the rock shaft for compressing the spring and holding the lug in contact with either of said cavities.

2. In an electric switch for motor vehicles as claimed in claim 1, a contact arm mounted on the steering wheel and movable between the yoke and collar for raising the arms of the yoke from the conductor plates.

In testimony whereof I affix my signature.

LEONARD P. DWYER.